Patented May 10, 1927.

1,627,963

UNITED STATES PATENT OFFICE.

HENRY C. FULLER, OF WASHINGTON, DISTRICT OF COLUMBIA.

MEDICINAL PRODUCT.

No Drawing.   Application filed January 30, 1920.  Serial No. 355,152.

In many liquid medicinal products, ethyl alcohol has heretofore been used as a solvent and preservative. The use of alcohol for these purposes is, however, now objected to and my invention has for its object to provide, for such uses, a substitute for alcohol.

I have discovered that in many medicinal products, there can be substituted for alcohol, glycerine or derivatives of glycerine or mixtures of glycerine and its derivatives.

As types of medicinal products in which glycerine or glycerine products functionate in place of alcohol, are liquid tonics, sarsaparilla compounds, cough syrups, bitters, laxatives, female remedies (so-called), kidney remedies, cod liver extracts, antiseptic solutions for douches, liniments, mouth washes, gargles, hair tonics, toilet waters, bay rums, etc.

By "medicinal products" I mean to designate products commonly known as fluid extracts and tinctures.

A fluid extract is a preparation made by removing from a vegetable drug its essential or medicinally active constitutents capable of use as remedial agents by means of a liquid. The valuable components of the drug dissolve in the liquid and are thereby separated from the insoluble and useless portions. The dissolving liquid, called the solvent, is usually alcohol. Fluid extracts are not to be confused with flavoring extracts, which consist of some volatile oil or flavoring principle dissolved in alcohol. Flavoring extracts are products of the food industry, and are made ordinarily by simply adding the proper proportion of the pure oil or flavoring compound to the pure alcohol. (Vanilla extract differs in its mode of preparation and conforms more nearly to a true fluid extract.)

Fluid extracts ordinarily are adjusted so that a pint of the finished extract represents one pound of the crude material used. A tincture is similar in character, but is usually only one tenth as strong, and may be obtained in the same way or by diluting the fluid extract.

Fluid extract of ginger and tincture of ginger are employed for both medicinal and culinary purposes. They are employed as medicine for their stomachic effect, serving to stimulate the circulation of the blood vessels in the walls of the stomach, thereby tending to bring about an increased secretion of gastric juice, which aids the appetite and the digestion. Ginger is also a diaphoretic, that is, it stimulates perspiration and is a favorite remedy to break up a cold.

The scope of my invention will be best understood from a statement of the various types of medicaments or medicinal products to which it has been applied.

For example, glycerine may be used as an effective substitute for alcohol in making bitter tonics containing burdock root; cascara; juniper berries; poke root; mandrake; sassafras; ginger; celery seed; prickly ash bark; extract of licorice; barberry root bark; berberis aquifolium; senega root; sodium bicarbonate; sodium benzoate and a suitable quantity of 30 percent glycerine being used as the solvent.

A cough syrup may be made from lobelia; mullein; pipsissewa; horehound; blood root; pleurisy root; skunk cabbage; elecampane; boneset; sugar; sodium benzoate and a suitable quantity of 15 percent glycerine being used as a solvent.

A so-called female tonic may be made from carduus benedictus; viburnum prunifolium; blue cohosh; gentian; chirata; angostura; centaury; American ipecac; sodium benzoate and a suitable quantity of 25 percent glycerine being used as a solvent.

A cod-liver extract tonic may be made from hypophosphorous acid; calcium hypophosphite; sodium hypophosphite; salicylic acid; extract of cod-liver oil; flavor and a suitable quantity of 10 percent glycerine being used.

Some medicinal compounds contain essential oils and other substances, insoluble in water or glycerine, such as chloroform, menthol, camphor, thymol, and the like. Substances of this kind may be designated, for the purposes of this case, as "insoluble organic medicaments". In such compounds, I use, in combination with or instead of glycerine, glycerine derivatives such as those in which the glycerine molecule has been esterified by certain inorganic acids such as the halogen acids, or by organic acids such as acetic acid and other acids of the acetic series and halogen derivatives of these acids. Thus glycerol chlorhydrin, $C_3H_7O_2Cl$ is an example of an inorganic acid ester. Glycerol monoacetic ester, $C_5H_{10}O_4$ and monochloraceticmonoglyceride $C_5H_9O_4Cl$ are examples of organic acid esters.

These glycerine derivatives dissolve many insoluble organic medicaments, which are difficultly soluble or insoluble in glycerine. The solutions are miscible with water, have fungicidal properties; and are non-poisonous.

Examples of medicinal products in which these glycerine derivatives may be used are as follows:—

A bay-rum formula is as follows:
Oil of bay, 8 c. c.; oil of orange, 0.5 c. c.; oil of pimento 0.5 c. c.; monochloraceticmonoglyceride 600 c. c.; and water 400 c. c.

A mouth wash formula is as follows:—
Zinc chloride 2 grams; beta naphthol 0.5 grams; formaldehyde 6 drops; menthol 0.2 grams; methyl salicylate 1 c. c.; colored with amaranth; in 500 c. c. of 50 per cent glycerol chlorhydrin or monochloraceticmonoglyceride.

Another mouth wash or gargle formula is as follows:
Boric acid 25 grams; thymol 1 gram; eucalyptol 5 c. c.; methyl salicylate 1.2 c. c.; thyme oil 0.3 c. c.; menthol 1 gram; sodium salicylate 1.2 grams; sodium benzoate 6 grams; in 35 percent monochloraceticmonoglyceride; or in a menstruum of 5 percent glycerol chlorhydrin, 45 percent glycerine and 50 percent water.

A liniment formula is as follows:—
Iodine 4 grams; chloroform 125 c. c.; camphor 30 grams; rosemary oil 15 c. c.; lavender oil 15 c. c.; aconite extract 4 grams; and monochloraceticmonoglyceride 700 c. c.

It will be understood that the examples of medicaments above given are illustrative in character; and may be widely modified without departing from the spirit of my invention.

I claim:—

1. As new products, fluid extracts and tinctures comprising a vegetable drug used as a remedial agent and a halogen-containing ester of glycerine.

2. As new products fluid extracts and tinctures comprising a vegetable drug used as a remedial agent and a halogen organic acid ester of glycerine.

3. As new products, fluid extracts and tinctures comprising a vegetable drug used as a remedial agent and a halogen acetic acid ester of glycerine.

4. As new products, fluid extracts and tinctures comprising a vegetable drug used as a remedial agent and a chloracetic acid ester of glycerine.

5. As new products, fluid extracts and tinctures comprising a vegetable drug used as a remedial agent and monochloraceticmonoglyceride.

In testimony whereof, I affix my signature.

HENRY C. FULLER.